(12) United States Patent
Bao et al.

(10) Patent No.: US 12,112,047 B2
(45) Date of Patent: Oct. 8, 2024

(54) METHOD, DEVICE AND COMPUTER PROGRAM PRODUCT FOR LOCKING A STORAGE AREA IN A STORAGE SYSTEM

(71) Applicant: Dell Products L.P., Round Rock, TX (US)

(72) Inventors: Haiyun Bao, Beijing (CN); Jianbin Kang, Beijing (CN); Jibing Dong, Beijing (CN); Geng Han, Beijing (CN)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 17/988,979

(22) Filed: Nov. 17, 2022

(65) Prior Publication Data

US 2023/0342043 A1    Oct. 26, 2023

(30) Foreign Application Priority Data

Apr. 21, 2022  (CN) .......................... 202210424068.7

(51) Int. Cl.
*G06F 3/06* (2006.01)

(52) U.S. Cl.
CPC .......... *G06F 3/0622* (2013.01); *G06F 3/0653* (2013.01); *G06F 3/0673* (2013.01); *G06F 3/0689* (2013.01)

(58) Field of Classification Search
CPC ...... G06F 3/067; G06F 3/0689; G06F 3/0659; G06F 3/061; G06F 3/0604; G06F 3/0622; G06F 16/1774; G06F 16/2343; G06F 16/182; G06F 11/2094; G06F 11/1076
See application file for complete search history.

(56) References Cited

U.S. PATENT DOCUMENTS

| | | | | |
|---|---|---|---|---|
| 6,151,659 A | * | 11/2000 | Solomon | G06F 11/1076 |
| | | | | 710/200 |
| 8,082,379 B2 | | 12/2011 | Fachan et al. | |
| 9,009,742 B1 | * | 4/2015 | Fair | G06F 3/0659 |
| | | | | 719/330 |
| 9,201,802 B1 | | 12/2015 | Armangau et al. | |
| 9,864,643 B1 | | 1/2018 | Mullis, II et al. | |
| 9,996,289 B2 | | 6/2018 | Wang et al. | |
| 11,334,293 B1 | | 5/2022 | Leimbach et al. | |
| 2006/0265414 A1 | * | 11/2006 | Loaiza | G06F 16/2343 |
| | | | | 707/999.102 |
| 2007/0299864 A1 | * | 12/2007 | Strachan | G06F 9/526 |
| | | | | 707/999.102 |

(Continued)

*Primary Examiner* — Curtis James Kortman

(74) *Attorney, Agent, or Firm* — BainwoodHuang

(57) ABSTRACT

Techniques lock a storage area in a storage system including a first storage node and a second storage node. Such techniques involve adjusting a value of at least one of a first counter at the first node and a second counter at the second node in response to receiving a data access request for the storage area at at least one of the first node and the second node. Such techniques further involve allocating a lock flag to the first node in response to a ratio of the value of the first counter to the value of the second counter being greater than a first threshold, the lock flag indicating that the storage area is locked by the first node. Accordingly, storage resources required by nodes that are accessed more frequently in statistics are effectively reduced, and the efficiency of applying stripe lock reduction are improved.

20 Claims, 5 Drawing Sheets

(56) References Cited

U.S. PATENT DOCUMENTS

2011/0276542 A1* 11/2011 Whitehouse ........ G06F 16/1774
707/688
2023/0109344 A1* 4/2023 Kelley ................ G06F 11/3037
714/30

* cited by examiner

METHOD, DEVICE AND COMPUTER PROGRAM PRODUCT FOR LOCKING A STORAGE AREA IN A STORAGE SYSTEM

CROSS-REFERENCE TO RELATED APPLICATION

This application claims priority to Chinese Patent Application No. CN202210424068.7, on file at the China National Intellectual Property Administration (CNIPA), having a filing date of Apr. 21, 2022 and having "METHOD, DEVICE AND COMPUTER PROGRAM PRODUCT FOR LOCKING A STORAGE AREA IN A STORAGE SYSTEM" as a title, the contents and teachings of which are herein incorporated by reference in their entirety.

TECHNICAL FIELD

Embodiments of the present disclosure generally relate to the field of data storage technologies, and in particular, to a method, a device, and a computer program product for locking a storage area in a storage system.

BACKGROUND

With the development of data storage technologies, various data storage devices have been able to provide users with increasingly high data storage capabilities, and the data access speed has also been greatly improved. While data storage capabilities are improved, users also have increasingly high demands for data reliability and the response time of storage systems. At present, various data storage systems based on redundant array of independent disks have been developed to improve data reliability. When one or more disks in a storage system fail, data in the failed disks can be reconstructed from data on other normally operating disks.

The storage system may be accessed via storage nodes. In a typical dual storage node type storage system, two storage control nodes work together to process data access operations performed on the storage system, thereby providing higher availability and better performance. Each storage control node has its own memory (e.g., a cache), and memories in two storage controllers operate in a mirrored fashion. The two storage control nodes can receive data access instructions from the outside in parallel, and therefore, there may be a problem that the two storage control nodes operate on the same storage area at the same time. At this point, how to provide a safe and reliable locking mechanism to avoid an operation conflict of two storage control nodes has become a research hotspot.

SUMMARY OF THE INVENTION

In general, embodiments of the present disclosure provide a method, a device, and a computer program product for locking a storage area in a storage system.

According to a first aspect of the present disclosure, a method for locking a storage area in a storage system is provided. The storage system includes a first storage node and a second storage node. The method includes: adjusting a value of at least one of a first counter at the first storage node and a second counter at the second storage node in response to receiving a data access request for the storage area at at least one of the first storage node and the second storage node; and allocating a lock flag to the first storage node in response to a ratio of the value of the first counter to the value of the second counter being greater than a first threshold, the lock flag indicating that the storage area is locked by the first storage node. According to various embodiments of the present disclosure, storage resources required by nodes that are accessed more frequently in statistics can be effectively reduced, and the efficiency of applying stripe lock reduction can be improved.

According to a second aspect of the present disclosure, a device for locking a storage area in a storage system is provided. The storage system includes a first storage node and a second storage node. The device includes: one or more processors; a memory coupled to at least one of processor of the one or more processors; and computer program instructions stored in the memory, wherein the computer instructions, when executed by the at least one processor, cause the device to perform actions including: adjusting a value of at least one of a first counter at the first storage node and a second counter at the second storage node in response to receiving a data access request for the storage area at at least one of the first storage node and the second storage node; and allocating a lock flag to the first storage node in response to a ratio of the value of the first counter to the value of the second counter being greater than a first threshold, the lock flag indicating that the storage area is locked by the first storage node. According to various embodiments of the present disclosure, storage resources required by nodes that are accessed more frequently in statistics can be effectively reduced, and the efficiency of applying stripe lock reduction can be improved.

In a third aspect of the present disclosure, a computer program product is provided. The computer program product is tangibly stored on a computer-readable medium and includes machine-executable instructions. When executed, the machine-executable instructions cause a machine to perform the method according to the first aspect of the present disclosure.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principle of the present disclosure will be described below with reference to several example embodiments illustrated in the accompanying drawings. Although the drawings show preferred embodiments of the present disclosure, it should be understood that these embodiments are merely described to enable those skilled in the art to better understand and further implement the present disclosure, and not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

Figure 1:
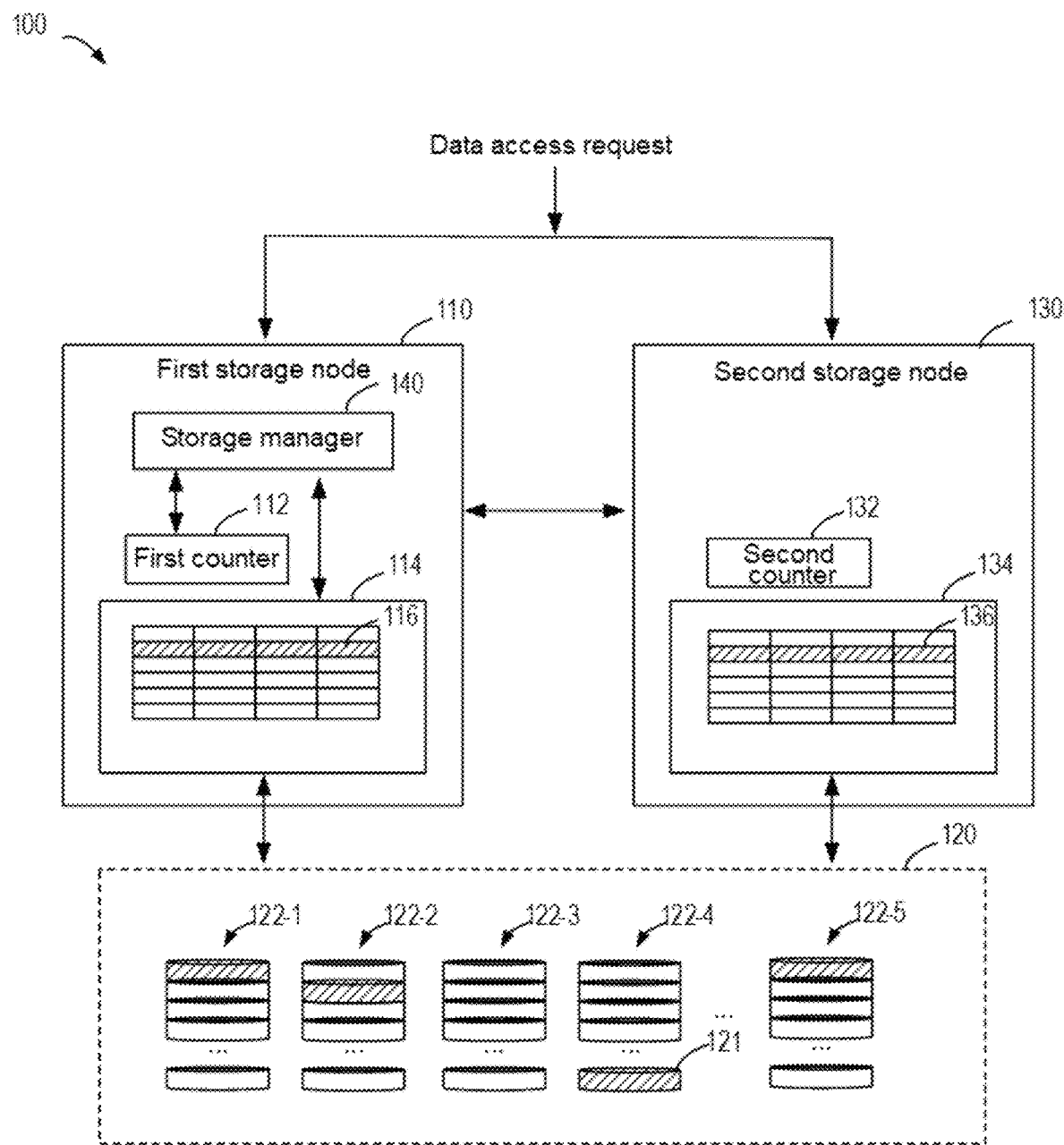
FIG. 1 is a schematic diagram of storage system 100 in which embodiments of the present disclosure can be implemented.

FIG. 1 is a schematic diagram of storage system 100 in which embodiments of the present disclosure can be implemented. Storage system 100 includes first storage node 110, second storage node 130, and physical storage layer 120. Physical storage layer 120 includes a plurality of (e.g., five) physical disks 122-1, 122-2, 122-3, . . . , and 122-5 for providing physical storage space to storage system 100. In the following description, these disks may be collectively or individually referred to as "storage device" or "disk" 122, which is not limited in the present disclosure herein. Disk 122 may be a variety of non-volatile disks, examples of which may include, but are not limited to, a Digital Versatile Disc (DVD), a Blue-ray Disc (BD), a Compact Disc (CD), a floppy disk, a hard disk, a tape drive, an optical drive, a solid state device (SSD), and so on. Other disks capable of providing storage space can also be used. Each disk 122 is divided into a plurality of sectors 121. The plurality of sectors 121 may have the same storage capacity. Sectors 121 may also sometimes be referred to as disk partitions, storage units, and the like, while physical storage layer 120 may also be referred to as a storage pool or a disk pool.

First storage node 110 may include storage manager 140 and first counter 112, and second storage node 130 may include second counter 132. Values of first counter 112 and second counter 132 are used for reflecting the historical numbers of times that first storage node 110 and second storage node 130 have been accessed, respectively, for indicating which storage node is a more "popular" storage node (i.e., a probability of being accessed is greater than 50%).

Storage manager 140 may dynamically adjust the values of first counter 112 and second counter 132 in response to receiving a data access request for a storage area at first storage node 110 or second storage node 130. Storage manager 140 may further allocate lock flag 150 to first storage node 110 or second storage node 130 according to the values of first counter 112 and second counter 132, and a detailed process will be explained below.

In some embodiments, storage manager 140 may further be included in second storage node 130. Alternatively, in some embodiments, storage manager 140 may also be arranged external to first storage node 110 and second storage node 130. The location of storage manager 140 may be arranged according to characteristics of storage system 100, which is not limited in the present disclosure.

One or more of RAID groups may be included inside first storage node 110 and second storage node 130. In FIG. 1, for the sake of simplicity, only one of the RAID groups is shown inside each storage node. Each of RAIDs 114 and 134 is built on a plurality of sectors 121 obtained by dividing a plurality of disks 122 of physical storage layer 120. Such RAIDs 114 and 134 are also sometimes referred to as mapped RAIDs or distributed RAIDs. RAIDs 114 and 134 may include a plurality of storage areas 116 and 136 that are mapped to one or more sectors 121 in one or more disks 122 in physical storage layer 120, respectively. When a user writes data to certain storage areas 116 and 136 of RAIDs 114 and 134, the written data will be stored in a plurality of physical sectors 121 corresponding to storage areas 116 and 136. In some embodiments, storage areas 116 and 136 are one or more stripes in storage system 100.

According to the dual storage node architecture described in the present disclosure, corresponding RAIDs 114 and 134 of the two storage nodes (i.e., first storage node 110 and second storage node 130) included in storage system 100 are in a one-to-one correspondence. In other words, the plurality of storage areas 116 and 136 inside the two RAIDs 116 and 136 are in one-to-one correspondence, and mapping of each storage area of RAID 116 and 136 to physical sector 121 in storage management layer 120 is also in one-to-one correspondence to mapping of each storage area of RAID 136 to physical sector 121 in storage management layer 120. In other words, first storage node 110 and second storage node 130 share the same logical storage space, and can jointly access the logical storage space.

According to requirements of the RAID technology, each of RAIDs 114 and 134 is evenly distributed on the plurality of available disks 122, that is, the plurality of storage areas (stripes) of each of RAIDs 113 and 134 are distributed as evenly as possible among the plurality of sectors 121 of various available disks 122 in physical storage layer 120. For example, as shown in FIG. 1, one storage area 116 of RAID 114 is mapped to one sector 121 of disk 122-1, one sector 121 of disk 122-2, one sector of disk 122-4, and one sector 121 of disk 122-5, respectively. It would be readily understood that only an example of one stripe is shown in FIG. 1, and other stripes can be mapped in a similar manner. It would also be readily understood that the number of storage areas 116 in the RAID and the width of each storage area 116 may be set flexibly. For RAID 134 in second storage node 130, its corresponding mapping is completely consistent with RAID 116, and therefore, its internal storage area 136 corresponds to the exact same sector 121 as storage area 116 in first storage node 110. It would be readily understood that the number of sectors 121 allocated to the RAID on each available disk 122 is substantially the same, thereby achieving an even distribution across a plurality of disks.

In the dual storage node architecture as depicted in FIG. 1, an I/O access request (also referred to as a data access request hereinafter) from an external host is sent to first storage node 110 or second storage node 130, and is processed by first storage node 110 or second storage node 130 simultaneously. Storage manager 140 in first storage node 110 may have a cache for receiving and caching data access requests from external hosts and flushing the data access requests into RAID 114 in first storage node 110. The process of receiving the data request by second storage node 130 is similar to the above, and will not be repeated here.

It would be readily understood that a plurality of consecutive data access requests for RAID 114 and RAID 134 from an external host will access both RAID 114 and RAID 134 at the same time. Since RAID 114 and RAID 134 correspond to the same physical storage space at the same time, this will inevitably bring about an issue of access conflict. For example, first storage node 110 may be currently performing a write operation on storage area 116 in RAID 114, and second storage node 130 may simultaneously tend to write data to storage area 136 corresponding to storage area 116. The two stripes correspond to the same physical sector 121, and therefore, in this case, if no corresponding measures are taken, it will inevitably cause confusion or loss of user data.

Conventionally, the following synchronization mechanism is usually employed to strictly coordinate and control the access operations of first storage node 110 and second storage node 130 to respective RAIDs 114 and 134. Specifically, each access request needs to obtain an operation permission on the current stripe (hereinafter also referred to as a stripe lock) before performing the actual operation. Basic principles thereof are as follows:

1) For a write operation, each access request must acquire an exclusive stripe lock for a target stripe, so that another access request (regardless of a read or write operation) cannot access the target stripe.
2) For a read operation, each access request needs to acquire a shared stripe lock for a target stripe. In this case, if another access request also needs to perform a read operation on the target stripe, the shared stripe lock can also be acquired, thereby realizing simultaneous read operations on the same target stripe.
3) Each access request needs to be processed in an order in which it is received.

For example, when RAID 114 in first storage node 110 receives access request A that tends to perform a write operation on certain target storage area 116 therein, it first needs to acquire an exclusive stripe lock for the target stripe. It is assumed that there are no other access requests to perform write operations on the target storage area at the same time, the above access request A can acquire an exclusive stripe lock for the target storage area, and then perform a write operation on the target storage area. However, while performing the write operation, if RAID 134 in second storage node 130 receives access request B that tends to perform a write operation for certain target storage area 136 therein (the target storage area corresponds to storage area 116 currently being written), the access request B also needs to try to acquire an exclusive stripe lock for target storage area 136. Apparently, at this point, access request B cannot obtain an exclusive stripe lock, so it cannot execute current access request B for target storage area 136, but can only wait until execution of access request A in first storage node 110 is completed and the exclusive stripe lock is released. Access request B in first storage node 130 can then acquire the exclusive stripe lock and perform a write operation on storage area 136.

As can be seen, in order to obtain an exclusive stripe lock on the target storage area to lock the target area for performing a write operation, a large amount of communication will be performed between storage nodes in the storage system, which occupies a large amount of bandwidth and storage resources. In a conventional storage system, statistics is usually made on a storage node to which data access is more frequent (a "popular" node), and an exclusive stripe lock is directly set on the "popular" node to reduce the bandwidth and storage resources occupied by inter-node communication.

In some solutions, a queue is used for counting the number of times each node is accessed. For example, in order to count the number of times first storage node 110 and second storage node 130 are accessed in 128 historical data accesses, a queue that occupies 128 bits of storage resources is used to determine which node is the more "popular" node. This kind of queue occupies a large amount of storage resources. In a storage system that needs to make statistics on massive historical accesses, the queue that occupies a large amount of storage resources causes a computing delay of the storage system, resulting in a poor user experience.

In order to at least partially solve the above problems and one or more of other potential problems, the embodiments of the present disclosure propose a solution for locking a storage area in a storage system. The scheme counts data access requests using a first counter and a second counter arranged in the first storage node and the second storage node, and locks the storage area according to values of the first counter and the second counter. According to various embodiments of the present disclosure, a counter that occupies a relatively small amount of storage resources can be effectively used for counting historical accesses of storage nodes, thereby increasing the speed at which the storage nodes process data access requests and improving the storage efficiency.

Figure 2:
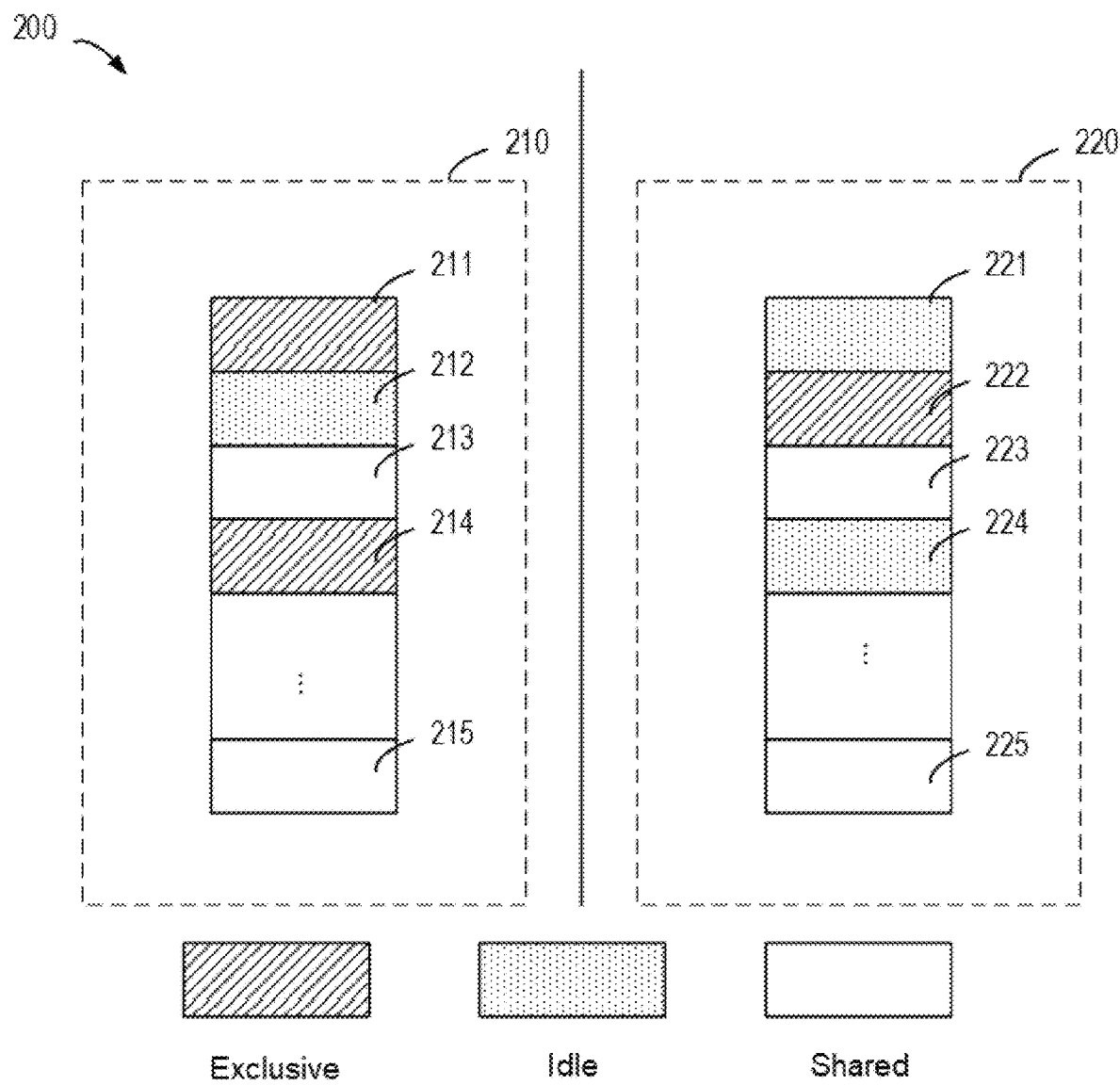
FIG. 2 is schematic diagram 200 of stripe lock cache in storage system 100 according to an embodiment of the present disclosure.

FIG. 2 is schematic diagram 200 of stripe lock cache in storage system 100 according to an embodiment of the present disclosure. In FIG. 2, stripe lock cache 210 in first storage node 110 and stripe lock cache 220 in second storage node 130 are simultaneously shown. Stripe lock cache 210 has a plurality of units 211, 212, . . . , and 215 referred to as slots, and stripe lock cache 220 also has units 221, 222, . . . , and 225, wherein ach unit corresponds to a storage area of a RAID storage space. It should be understood that such numbers are merely illustrative.

Stripe lock cache 210 stored in RAID 114 in first storage node 110 and stripe lock cache 220 stored in RAID 134 in second storage node 130 are in one-to-one correspondence, wherein each storage area and its corresponding storage areas all correspond to the same logical storage space, and all correspond to the same physical storage space. For example, in FIG. 2, unit 211 corresponds to unit 221, unit 212 corresponds to unit 222, and so on. Moreover, each unit in the stripe lock cache identifies a current access state of a local storage node to the storage area.

Specifically, each unit in stripe lock caches 210 and 220 may have three states: exclusive, idle, and shared. For the exclusive state, it means that the local storage node currently has an exclusive access right to the storage area, and can write data to the storage space of the storage area. It would be readily understood that if the local storage node currently has an exclusive state for a certain storage area, a current state of a peer storage node for the storage area can only be an idle state, that is, no access operation can be performed. Similarly, if the local storage node currently has an idle state for a certain storage area, the peer storage node must currently be in an exclusive state for the storage area. For the shared state, it means that the local storage node and the peer storage node currently jointly have shared access to a certain storage area. At this point, the local storage node and the peer storage node can only perform read access to the storage area at the same time.

Referring to FIG. 2, unit 211 of stripe lock cache 210 currently has an exclusive state, and correspondingly, unit 221 of stripe lock cache 220 currently has an idle state. Similarly, unit 212 has an idle state, while unit 222 has an exclusive state. In addition, both unit 213 and corresponding unit 223 have a shared state.

It should be noted that the present disclosure is to make statistics on a "popular" node that is accessed more frequently, and therefore does not consider the situation where both the local storage node and the peer storage node are in a shared state. In fact, the above sharing situation does not affect the solution of the present disclosure, and in theory, each node may be recorded 0.5 times. In the present disclosure, allocating a storage flag to a storage node means that for a target storage area, the storage node has an exclusive state, that is, the target storage area is locked by the storage node.

Figure 3:
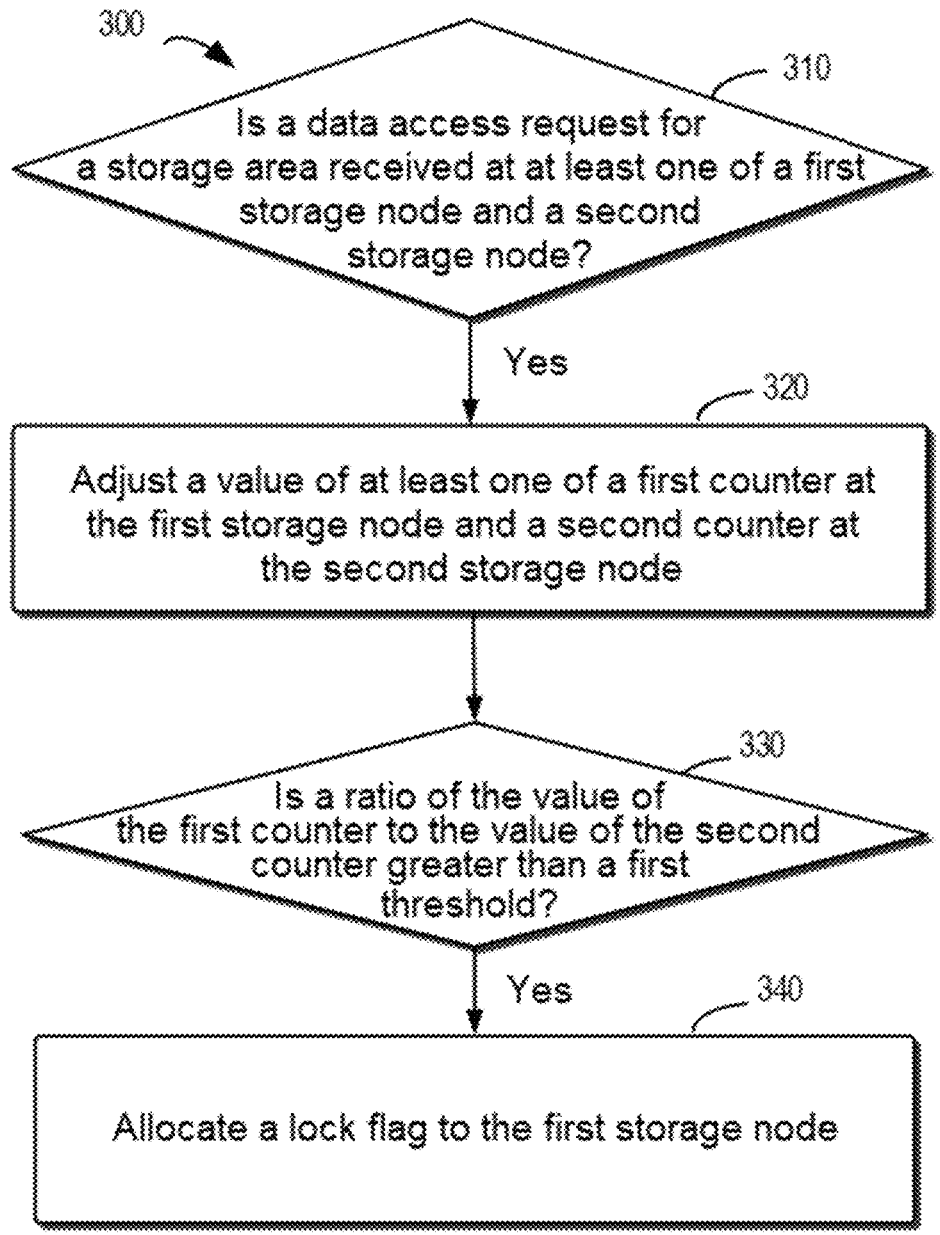
FIG. 3 is flow chart 300 of a method for locking a storage area in a storage system according to an embodiment of the present disclosure.

FIG. 3 is flow chart 300 of a method for locking a storage area in a storage system according to an embodiment of the present disclosure. The method in FIG. 3 will be described with reference to FIG. 1.

At block 310, storage manager 140 determines whether a data access request for storage areas 116 and 136 is received at at least one of first storage node 110 and second storage node 130. For example, the data access request may be a write request or a read request to storage areas 116 and 136, that is, a user wants to write data to or read data from physical storage layer 120 associated with storage areas 116 and 136.

In some embodiments, storage areas 116 and 136 are one or more stripes in storage system 100.

At block 320, storage manager 140 adjusts a value of at least one of first counter 112 at first storage node 110 and second counter 132 at second storage node 120 in response to receiving a data access request for storage areas 116 and 136 at at least one of first storage node 110 and second storage node 130. For example, if storage manager 140 determines that a read request is received at first storage node 110, storage manager 140 may increment the value of the first counter by one. Storage manager 140 may also decrement the value of the counter in a case that the counter is full. Please note that the present disclosure sets first storage node 110 and second storage node 130 as peer nodes, that is, the situation described for first storage node 110 in the present disclosure is also applicable to second storage node 130.

First counter 112 and second counter 132 may be N-nary M-bit counters (N and M are positive integers), and counting ranges of the counters are 0 to $N^M-1$, that is, the capacity of the N-nary M-bit counter is $N^M$. In embodiments of the present disclosure, for simplicity, and as a non-limiting example, it is assumed that N=2 and M=7. First counter 112 and second counter 132 are both binary 7-bit counters, the counting range thereof is 0 to 127, the capacity is 128, and the storage resource occupied is 7 bits. It can be understood that counters with different bases and digits may be arranged according to needs of storage system 100.

In one example, storage manager 140 increments the value of first counter 112 in response to receiving a data access request for storage area 116 at first storage node 110 and the value of first counter 112 and the value of second counter 132 being both less than a second threshold. For example, when storage manager 140 determines that a write request for storage area 116 is received at first storage node 110, storage manager 140 further determines whether the values of first counter 112 and second counter 132 are greater than the second threshold, and if both are less than the second threshold, storage manager 140 increments the value of the first counter by one.

In some embodiments, the second threshold is associated with the capacities of first counter 112 and second counter 132. For example, if first counter 112 and second counter 132 are binary 7-bit counters, and the capacity of the counters is $2^7=128$, the second threshold may be set to a positive integer smaller than 128. In order to make full use of the capacity of the counter, the second threshold may be set to be 1 less than the capacity of the counter, or may be set to other suitable values smaller than the capacity, which is not limited in the present disclosure. The situation discussed above is the situation in which none of the values in the counter overflows, and the situation in which the value in the counter is about to exceed the capacity of the counter will be discussed below.

In one example, storage manager 140 decrements the value of one of first counter 112 and second counter 132 based on the value of first counter 112 and the value of second counter 132 in response to receiving a data access request for storage area 116 at first storage node 110, and at least one of the value of first counter 112 and the value of second counter 132 being equal to the second threshold. For example, when storage manager 140 determines that a write request for storage area 116 is received at first storage node 110, storage manager 140 further determines whether the values of first counter 112 and second counter 132 are greater than the second threshold. If storage manager 140 determines that at least one of the values is equal to the second threshold, indicating that one of the two counters will overflow (exceeds the counter capacity), storage manager 140 will decrement the value of one counter by 1 according to current values of first counter 112 and second counter 132.

In some embodiments, storage manager 140 determines a first probability, and the first probability is a ratio of the value of first counter 112 to a sum of the value of first counter 112 and the value of second counter 132. Then, storage manager 140 decrements the value of first counter 112 with the first probability. For example, for a binary 7-bit counter, the value of the first counter is 127, and the value of the second counter is 1. Storage manager 140 determines that a write request for storage area 116 is received at first storage node 110 and determines that the value of the first counter is equal to second threshold 127. Storage manager 140 further determines that the first probability=127/128, then storage manager 140 decrements the value of first counter 112 by 1 with the probability of 127/128. Memory manager 140 then further increments the value of first counter 112 by 1. In the above case, there is a probability of 127/128 that a ratio of the value of first counter 112 to the value of second counter 132 remains 127:1. This indicates that first storage node 110 continues to remain a more frequently accessed node. It is understandable that, compared with counting through a queue, although the value of the counter cannot tell the order in which the nodes are accessed, it is reasonable to eliminate the number of accesses to the storage node with a large value on the counter with a high probability.

In some embodiments, storage manager 140 determines a second probability, and the second probability is a ratio of the value of second counter 132 to the sum of the value of first counter 112 and the value of second counter 132, and decrements the value of second counter 132 with the second probability. For example, for a binary 7-bit counter, the value of the first counter is 1, and the value of the second counter is 127. Storage manager 140 determines that a write request for storage area 116 is received at first storage node 110 and determines that the value of second counter 132 is equal to second threshold 127. Storage manager 140 further determines that the second probability=127/128, then storage manager 140 decrements the value of second counter 132 by 1 with the probability of 127/128. Memory manager 140 then further increments the value of first counter 112 by 1. In the above case, there is a probability of 127/128 that a ratio of the value of the first counter to the value of the second counter becomes 2:126. It can be understood that, in the above situation, if there are constant access requests from the first storage node, the value of the counter on the first storage node will continue to be incremented, eventually exceeding the value of the counter at the second storage node. This indicates that the first storage node tends to become a more frequently accessed node.

The present disclosure uses counters instead of queues to count the historical accesses to storage nodes, and replaces a FIFO queue that occupies 128 bits of storage space by two counters that occupy 7-bit storage space, so as to reduce the storage space occupation while decrementing or incrementing the values of the counters at a reasonable ratio. The use of the above counters makes it possible to increase the processing speed of the storage system and improve the efficiency.

At block 330, storage manager 140 determines whether a ratio of the value of first counter 112 to the value of second counter 132 is greater than a first threshold. For example, the first threshold may be 2, then storage manager 140 determines whether the value of first counter 112 is twice the value of second counter 132, that is, within a certain historical access interval, the number of accesses to the first storage node exceeds more than twice the number of accesses to the second storage node.

Please note that the first threshold may be set according to storage system 100, user requirements, or the like, which is not limited in this disclosure. Setting the first threshold according to the characteristics of the storage system allows more accurate determination of which storage node is the frequently accessed node, thereby laying the foundation for allocating a lock flag (stripe lock).

In some embodiments, storage manager 140 determines that the ratio of the value of first counter 112 to the value of second counter 132 is not greater than the first threshold, then it proceeds to the step of adjusting the value of the counter in block 320.

At block 340, storage manager 140 determines that the ratio of the value of first counter 112 to the value of second counter 132 is greater than the first threshold, and allocates lock flag 150 to first storage node 110, lock flag 150 indicating that storage area 116 is locked by first storage node 110. For example, when determining that the number of accesses to first storage node 110 exceeds the first threshold multiple of the number of accesses to second storage node 130 within the historical access interval, storage manager 140 allocates lock flag 150 to first storage node 110. The lock flag indicates that the state of the first storage node for storage area 116 in one unit of stripe lock cache 210 is an exclusive state. In other words, storage area 116 is locked by first storage node 110 and can only be read and written by first storage node 110.

In some embodiments, storage manager 140 resets the value of first counter 112 and the value of second counter 132 to zero in response to lock flag 150 not being allocated to any one of first storage node 110 and second storage node 130. By resetting the value of first counter 112 and the value of second counter 132 to zero, the storage space occupied by the counters can be further released, thereby improving the storage efficiency.

According to various embodiments of the present disclosure, a lock flag (stripe lock) can be accurately allocated to a frequently accessed node through a counter that occupies less storage space, thereby increasing the storage speed and improving the storage efficiency.

Figure 4:
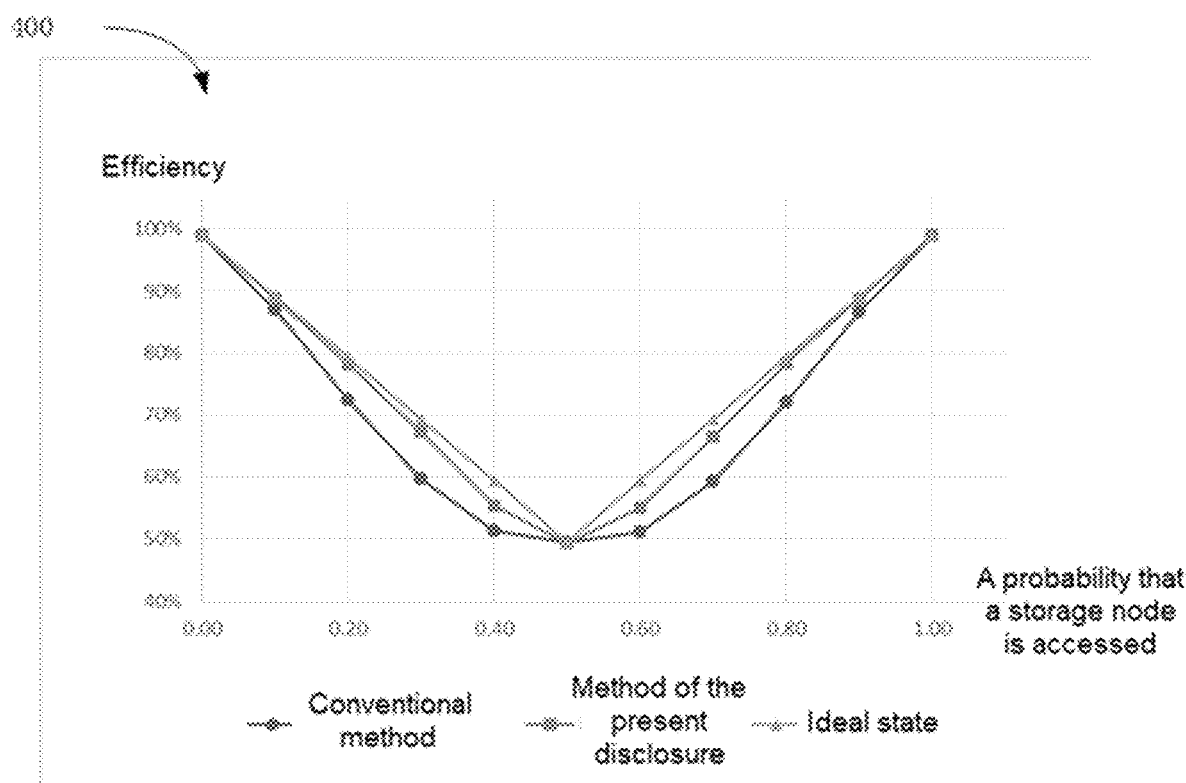
FIG. 4 is schematic diagram 400 of locking efficiency according to an embodiment of the present disclosure.

FIG. 4 is schematic diagram 400 of locking efficiency according to an embodiment of the present disclosure. The abscissa of schematic diagram 400 indicates the probability of the storage node being accessed from 0 to 1 (represented by letter P hereinafter), and the ordinate indicates the locking efficiency, that is, the probability that the lock flag is allocated to the storage node and the node is accessed within a certain historical interval.

The triangular curve in FIG. 4 represents the ideal situation, that is, the lock flag is allocated to a node whose access probability is P, and the storage node is just accessed, and its efficiency is P. The circle curve in FIG. 4 represents a conventional method in the art, and its efficiency is P*P+(1-P)*(1-P), that is, the probability of the popular node receiving an access request for the first time is P, and the probability of a subsequent access request is P. The probability of receiving an access request for the first time for an unpopular node is 1-P, and the probability of a subsequent access request is 1-P. As can be seen, an efficiency difference between the conventional method and the ideal situation is P−P*P+(1-P)*(1-P). With the technical solution of the present disclosure, a locked state close to an ideal state can be achieved under the condition of occupying a small storage space (refer to the block curve, the efficiency is close to the ideal state and higher than that of the conventional method).

Figure 5:
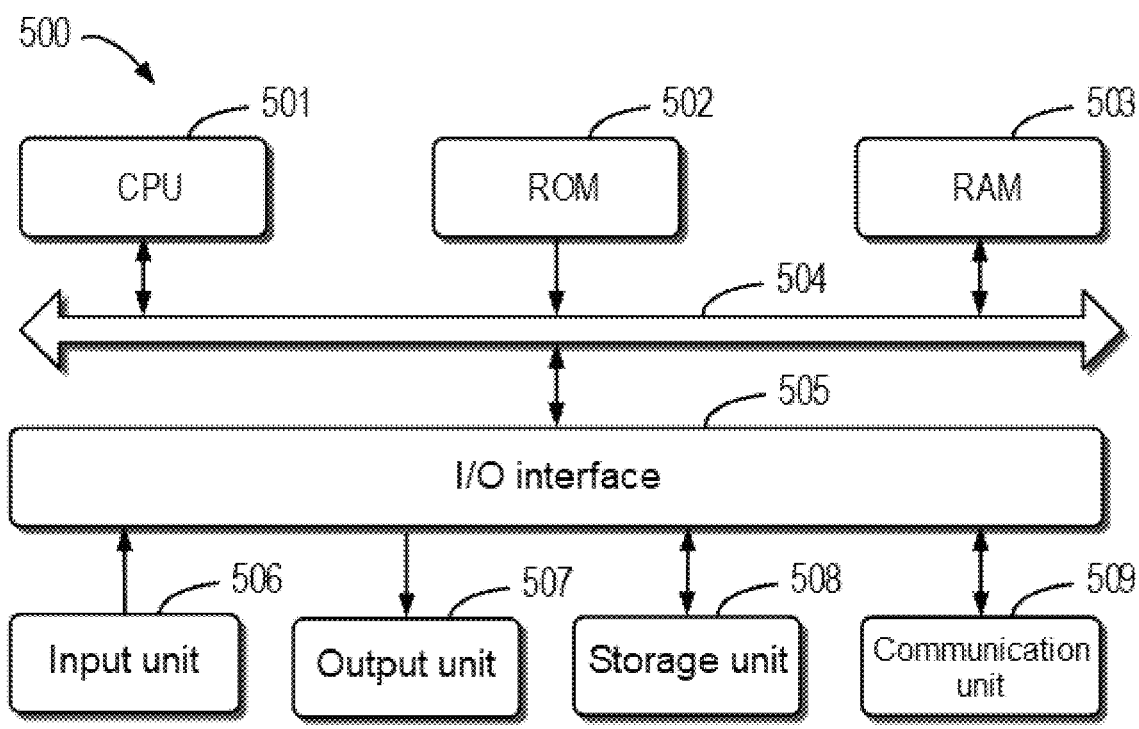
FIG. 5 is a schematic block diagram of device 500 that can be used for implementing an embodiment of the present disclosure.

FIG. 5 is a schematic block diagram of device 500 that can be used for implementing an embodiment of the present disclosure. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

In some embodiments, CPU 501 can be configured to perform the various processes and processing described above, such as method or process 300. For example, in some embodiments, method or process 300 may be implemented as a computer software program that is tangibly included in a machine-readable medium such as storage unit 508. In some embodiments, part of or all the computer program may be loaded and/or installed to device 500 via ROM 502 and/or communication unit 509. One or more steps of method or process 300 described above may be performed when the computer program is loaded into RAM 503 and executed by CPU 501.

In particular, according to embodiments of the present disclosure, the processes described above with reference to FIG. 5 may be implemented as computer program products that may be tangibly stored on a non-transitory computer-readable storage medium and include computer-executable instructions that, when executed, cause the device to implement aspects in accordance with the present disclosure.

The computer-readable storage medium may be a tangible device that can store instructions used by an instruction execution device. For example, the computer-readable storage medium may include, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a RAM, a ROM, an erasable programmable read only memory (EPROM or flash memory), a static random access memory (SRAM), a portable compact disc read only memory (CD-ROM), a digital versatile disc (DVD), a memory stick, a floppy disk, a mechanical encoding device such as a punch card or a protruding structure within a groove having instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Java, Smalltalk, and C++, and conventional procedural programming languages, such as the "C" language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to block diagrams and/or flow charts of the device, the method, and the computer program product according to embodiments of the present disclosure. It should be understood that each block in the block diagrams and/or flow charts as well as a combination of blocks in the block diagrams and/or flow charts may be implemented by using the computer-readable program instructions.

Through the teachings presented in the foregoing descriptions and the associated drawings, many modifications and other embodiments of the present disclosure set forth herein will come to mind to those skilled in the art related in the present disclosure. Therefore, it is to be understood that the embodiments of the present disclosure are not to be limited to the specific embodiments disclosed and that modifications and other embodiments are intended to be included within the scope of the present disclosure. Additionally, while the foregoing description and associated drawings describe example embodiments in the context of certain example combinations of components and/or functions, it should be appreciated that various combinations of components and/or functions may be provided by alternative embodiments without departing from the scope of the present disclosure. In this regard, for example, other combinations of components and/or functions different from those expressly described above are also contemplated to be within the scope of the present disclosure. Although specific terms are employed herein, they are used in a generic and descriptive sense only and are not intended to be limiting.

The invention claimed is:

1. A method of locking a storage area in a storage system, the storage system comprising a first storage node and a second storage node, and the method comprising:
adjusting a value of at least one of a first counter at the first storage node and a second counter at the second storage node in response to receiving a data access request for the storage area at one of the first storage node and the second storage node; and
allocating a lock flag to the first storage node in response to a ratio of the value of the first counter to the value of the second counter being greater than a first threshold, wherein the lock flag imposes a lock on the storage area by the first storage node;
wherein adjusting the value of at least one of the first counter and the second counter comprises:
decrementing the value of one of the first counter and the second counter based on the value of the first counter and the value of the second counter in response to receiving the data access request for the storage area at the first storage node and at least one of the value of the first counter and the value of the second counter being equal to a second threshold; and
wherein decrementing the value of one of the first counter and the second counter comprises:
determining a first probability, the first probability being a ratio of the value of the first counter to a sum of the value of the first counter and the value of the second counter; and
decrementing the value of the first counter with the first probability.

2. The method according to claim 1, further comprising:
adjusting the value of at least one of the first counter and the second counter in response to receiving another data access request by incrementing the value of the first counter in response to receiving the other data access request for the storage area at the first storage node and both the value of the first counter and the value of the second counter being less than the second threshold.

3. The method according to claim 2, wherein the second threshold is associated with capacities of the first counter and the second counter.

4. The method according to claim 1, further comprising:
adjusting the value of at least one of the first counter and the second counter in response to receiving another data access request by decrementing the value of one of the first counter and the second counter based on the value of the first counter and the value of the second counter in response to receiving the other data access request for the storage area at the first storage node and at least one of the value of the first counter and the value of the second counter being equal to the second threshold.

5. The method according to claim 4, wherein adjusting the value of at least one of the first counter and the second counter in response to receiving the other data access request by decrementing the value of one of the first counter and the second counter comprises:
determining a second probability, the second probability being a ratio of the value of the second counter to the sum of the value of the first counter and the value of the second counter; and
decrementing the value of the second counter with the second probability.

6. The method according to claim 1, further comprising:
resetting the value of the first counter and the value of the second counter to zero in response to the lock flag not being allocated to any one of the first storage node and the second storage node.

7. The method according to claim 1, wherein the storage area is one or more stripes of the storage system.

8. A device for locking a storage area in a storage system, the storage system comprising a first storage node and a second storage node, and the device comprising:
one or more processors;
a memory coupled to at least one processor of the one or more processors; and
computer program instructions stored in the memory, wherein the computer program instructions, when executed by the at least one processor, cause the device to perform actions comprising:
adjusting a value of at least one of a first counter at the first storage node and a second counter at the second storage node in response to receiving a data access request for the storage area at one of the first storage node and the second storage node; and
allocating a lock flag to the first storage node in response to a ratio of the value of the first counter to the value of the second counter being greater than a first threshold, wherein the lock flag imposes a lock on the storage area by the first storage node;
wherein adjusting the value of at least one of the first counter and the second counter comprises:
decrementing the value of one of the first counter and the second counter based on the value of the first counter and the value of the second counter in response to receiving the data access request for the storage area at the first storage node and at least one of the value of the first counter and the value of the second counter being equal to a second threshold; and
wherein decrementing the value of one of the first counter and the second counter comprises:
determining a first probability, the first probability being a ratio of the value of the first counter to a sum of the value of the first counter and the value of the second counter; and
decrementing the value of the first counter with the first probability.

9. The device according to claim 8, further comprising:
adjusting the value of at least one of the first counter and the second counter in response to receiving another data access request by incrementing the value of the first counter in response to receiving the other data access request for the storage area at the first storage node and both the value of the first counter and the value of the second counter being less than the second threshold.

10. The device according to claim 9, wherein the second threshold is associated with capacities of the first counter and the second counter.

11. The device according to claim 8, further comprising:
adjusting the value of at least one of the first counter and the second counter in response to receiving another data access request by decrementing the value of one of the first counter and the second counter based on the value of the first counter and the value of the second counter in response to receiving the other data access request for the storage area at the first storage node and at least one of the value of the first counter and the value of the second counter being equal to the second threshold.

12. The device according to claim 11, wherein adjusting the value of at least one of the first counter and the second counter in response to receiving the other data access request by decrementing the value of one of the first counter and the second counter comprises:
determining a second probability, the second probability being a ratio of the value of the second counter to the sum of the value of the first counter and the value of the second counter; and
decrementing the value of the second counter with the second probability.

13. The device according to claim 8, wherein the actions further comprise:
resetting the value of the first counter and the value of the second counter to zero in response to the lock flag not being allocated to any one of the first storage node and the second storage node.

14. The device according to claim 8, wherein the storage area is one or more stripes of the storage system.

15. A computer program product having a non-transitory computer readable medium which stores a set of instructions to lock a storage area in a storage system, the storage system comprising a first storage node and a second storage node; the set of instructions, when carried out by computerized circuitry, causing the computerized circuitry to perform a method of:
adjusting a value of at least one of a first counter at the first storage node and a second counter at the second storage node in response to receiving a data access request for the storage area at one of the first storage node and the second storage node; and
allocating a lock flag to the first storage node in response to a ratio of the value of the first counter to the value of the second counter being greater than a first threshold, wherein the lock flag imposes a lock on the storage area by the first storage node;

wherein adjusting the value of at least one of the first counter and the second counter comprises:

decrementing the value of one of the first counter and the second counter based on the value of the first counter and the value of the second counter in response to receiving the data access request for the storage area at the first storage node and at least one of the value of the first counter and the value of the second counter being equal to a second threshold; and wherein decrementing the value of one of the first counter and the second counter comprises:

determining a first probability, the first probability being a ratio of the value of the first counter to a sum of the value of the first counter and the value of the second counter; and decrementing the value of the first counter with the first probability.

16. The computer program product according to claim 15, wherein the method further comprises:

resetting the value of the first counter and the value of the second counter to zero in response to the lock flag not being allocated to any one of the first storage node and the second storage node.

17. The computer program product according to claim 16, wherein the second threshold is associated with capacities of the first counter and the second counter.

18. The computer program product according to claim 15, wherein the storage area is one or more stripes of the storage system.

19. A method of locking a storage area in a storage system, the storage system comprising a first storage node and a second storage node, and the method comprising:

adjusting a value of at least one of a first counter at the first storage node and a second counter at the second storage node in response to receiving a data access request for the storage area at one of the first storage node and the second storage node; and allocating a lock flag to the first storage node in response to a ratio of the value of the first counter to the value of the second counter being greater than a first threshold, wherein the lock flag imposes a lock on the storage area by the first storage node;

wherein adjusting the value of at least one of the first counter and the second counter comprises:

decrementing the value of one of the first counter and the second counter based on the value of the first counter and the value of the second counter in response to receiving the data access request for the storage area at the first storage node and at least one of the value of the first counter and the value of the second counter being equal to a second threshold; and wherein decrementing the value of one of the first counter and the second counter comprises:

determining a second probability, the second probability being a ratio of the value of the second counter to a sum of the value of the first counter and the value of the second counter; and decrementing the value of the second counter with the second probability.

20. The method according to claim 19, further comprising:

resetting the value of the first counter and the value of the second counter to zero in response to the lock flag not being allocated to any one of the first storage node and the second storage node.

\* \* \* \* \*